US010199627B2

United States Patent
Guo et al.

(10) Patent No.: US 10,199,627 B2
(45) Date of Patent: Feb. 5, 2019

(54) SECONDARY BATTERY

(71) Applicant: Contemporary Amperex Technology Co., Limited, Ningde (CN)

(72) Inventors: Jian Guo, Ningde (CN); Quankun Li, Ningde (CN); Pinghua Deng, Ningde (CN); Lingbo Zhu, Ningde (CN); Qingkui Chi, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 131 days.

(21) Appl. No.: 15/398,457

(22) Filed: Jan. 4, 2017

(65) Prior Publication Data

US 2017/0207437 A1   Jul. 20, 2017

(30) Foreign Application Priority Data

Jan. 14, 2016   (CN) .......................... 2016 1 0023257

(51) Int. Cl.
*H01M 2/00* (2006.01)
*H01M 2/24* (2006.01)
(Continued)

(52) U.S. Cl.
CPC .......... *H01M 2/24* (2013.01); *H01M 2/0404* (2013.01); *H01M 2/0469* (2013.01); *H01M 2/26* (2013.01); *H01M 2/30* (2013.01); *H01M 10/0436* (2013.01)

(58) Field of Classification Search
CPC ............ H01M 2/24; H01M 2/26; H01M 2/30; H01M 2/0469
See application file for complete search history.

(56) References Cited

U.S. PATENT DOCUMENTS

2009/0111004 A1   4/2009   Jang et al.
2012/0189899 A1*  7/2012   Kanda ................... H01M 2/266
                                                                429/153

FOREIGN PATENT DOCUMENTS

CN          202585544 U      12/2012
CN          202839828 U       3/2013
(Continued)

OTHER PUBLICATIONS

Contemporary Amperex Technology Co., Limited, Extended European Search Report, EP17150790.8, Feb. 22, 2017, 11 pgs.

*Primary Examiner* — Cynthia H Kelly
*Assistant Examiner* — Monique M Wills
(74) *Attorney, Agent, or Firm* — Morgan, Lewis & Bockius LLP

(57) ABSTRACT

The invention provides a secondary battery which comprises a cap plate and at least one cell. The secondary battery further comprises connecting pieces, each connecting piece is parallel to the cap plate and positioned at an inside of the cap plate in a thickness direction of the cap plate, a longitudinal direction of each connecting piece is parallel to a length direction of the cap plate, a transverse direction of each connecting piece is parallel to a width direction of the cap plate. Each connecting piece has: a tab welding portion for being welded to the corresponding tab of each cell; and an electrode terminal welding portion connected to the tab welding portion along the longitudinal direction of each connecting piece for being welded to the corresponding electrode terminal of the cap plate so as to electrically connect the corresponding electrode terminal and the corresponding tab of each cell.

12 Claims, 6 Drawing Sheets

(51) Int. Cl.
*H01M 2/26* (2006.01)
*H01M 2/30* (2006.01)
*H01M 2/04* (2006.01)
*H01M 10/04* (2006.01)

(56) References Cited

FOREIGN PATENT DOCUMENTS

| | | |
|---|---|---|
| EP | 2136451 A2 | 12/2009 |
| EP | 2515358 A1 | 10/2012 |
| WO | WO2014/003361 A1 | 1/2014 |

\* cited by examiner

SECONDARY BATTERY

REFERENCE TO RELATED APPLICATIONS

The present application claims priority to Chinese patent application No. 201610023257.8, filed on Jan. 14, 2016, which is incorporated herein by reference in its entirety.

FIELD OF THE PRESENT DISCLOSURE

The present disclosure relates to a field of battery, and particularly relates to a secondary battery.

BACKGROUND OF THE PRESENT DISCLOSURE

FIGS. 12-14 are schematic assembled views of a secondary battery of the prior art, in which, FIG. 12 is a schematic view illustrating a connection relationship between tabs and electrode terminals before the tabs are bent in the secondary battery of the prior art; FIG. 13 is a perspective view of the secondary battery of the prior art; FIG. 14 is an enlarged view of a circle part of FIG. 13.

As shown in these figures, in the prior art, one end of each connecting piece 3 is welded to one tab 22, the other end of each connecting piece 3 is welded to one electrode terminal 11, and after each connecting piece 3 is welded to the tab 22 and the electrode terminal 11, there is a process of bending the tab, the tab 22 need be bent 180 degrees (that is, the tab 22 is bent twice to form a horizontal U-shape, as shown in FIG. 14), and at the same time each connecting piece 3 is also bent 180 degrees (to similarly form a horizontal U-shape), so that one of the connecting piece 3 and the tab 22 covers and clamps the other of the connecting piece 3 and the tab 22 relative to each other at a position where the connecting piece 3 and the tab 22 are welded together, therefore it has a high requirement on bending property of the connecting piece 3 and bending property of the tab 22. Because the connecting piece 3 easily generates fatigue crack and even fractures at bent positions, thereby affecting the life of the connecting piece 3. Moreover, after the tab 22 is bent twice, a part of the tab 22 far away from the connecting piece 3 (that is, the part where the tab 22 is connected to a main body 21 of the cell 2) is easily pulled during bending, which may result in that the tab 22 cracks and fractures at the part. In addition, because the connecting piece 3 is bent 180 degrees and the tab 22 is bent twice, the operation process is increased and the production cost is increased, the production efficiency is reduced, that both the connecting piece 3 and the tab 22 are bent on the main body 21 of the cell 2 in form of horizontal U-shape will take up more space, so that it is not beneficial to increase the energy density of the secondary battery.

SUMMARY OF THE PRESENT DISCLOSURE

In view of the problem existing in the background, an object of the present disclosure is to provide a secondary battery which reduces the requirement on bending property of a connecting piece and greatly reduces chips generated by the connecting piece due to bending fatigue of the connecting piece and a risk that the connecting piece fractures due to bending fatigue of the connecting piece.

Another object of the present disclosure is to provide a secondary battery which reduces the requirement on bending property of a tab and greatly reduces a risk that the tab fractures due to bending fatigue of the tab.

Still another object of the present disclosure is to provide a secondary battery which can reduce the production cost, improve the production efficiency and increase an available space in the secondary battery from whole height.

In order to achieve the above objects, the present disclosure provides a secondary battery which comprises a cap plate and at least one cell. The cap plate is provided with electrode terminals; each cell comprises a main body and tabs electrically connected to the main body and extending from the main body. The secondary battery further comprises connecting pieces, each connecting piece is parallel to the cap plate and positioned at an inside of the cap plate in a thickness direction of the cap plate, a longitudinal direction of each connecting piece is parallel to a length direction of the cap plate, a transverse direction of each connecting piece is parallel to a width direction of the cap plate. Each connecting piece has: a tab welding portion for being welded to the corresponding tab of each cell; and an electrode terminal welding portion connected to the tab welding portion along the longitudinal direction of each connecting piece for being welded to the corresponding electrode terminal of the cap plate so as to electrically connect the corresponding electrode terminal and the corresponding tab of each cell.

The present disclosure has the following beneficial effects: in the secondary battery according to the present disclosure, the corresponding tab of each cell is welded to the tab welding portion of the corresponding connecting piece, the corresponding electrode terminal of the cap plate is welded to the electrode terminal welding portion of the corresponding connecting piece so as to realize an electrical connection between the corresponding electrode terminal and the corresponding tab of each cell. And during the electrical connection of the connecting piece, each connecting piece need not be bent, which completely eliminates the requirement on bending property of each connecting piece, and in turn eliminates chips generated by each connecting piece due to bending fatigue of each connecting piece and a risk that each connecting piece fractures due to bending fatigue of each connecting piece. Moreover, with such a structure of each connecting piece, the secondary battery of the present disclosure also increases an available space in the secondary battery from whole height, improves the production efficiency and reduces the production cost.

BRIEF DESCRIPTION OF THE FIGURES

FIGS. 12-14 are schematic assembled views of a secondary battery of the prior art, in which, FIG. 12 is a schematic view illustrating a connection relationship between tabs and electrode terminals before the tabs are bent in the secondary battery of the prior art; FIG. 13 is a perspective view of the secondary battery of the prior art; FIG. 14 is an enlarged view of a circle part of FIG. 13.

Figure 1:
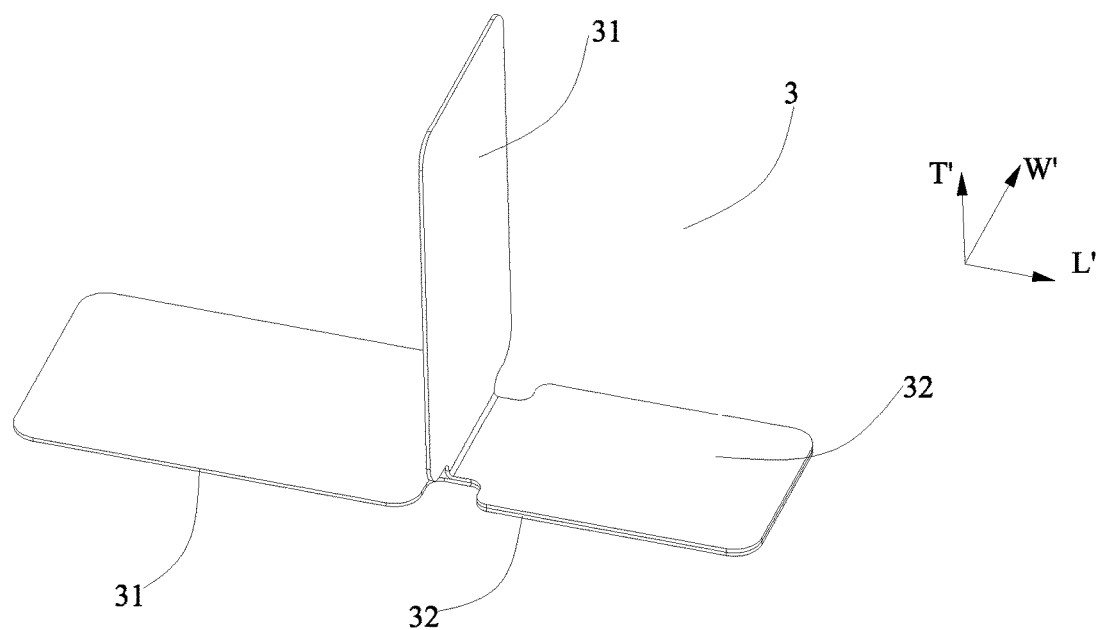
FIG. 1 is an enlarged perspective view of an embodiment of connecting pieces of a secondary battery according to the present disclosure.

Reference numerals are represented as follows:
1 cap plate
11 electrode terminal
2 cell
21 main body
22 tab
221 planar portion
222 upright portion
3 connecting piece
31 tab welding portion
32 electrode terminal welding portion
33 transitional portion
331 hole
L length direction of cap plate
W width direction of cap plate
T thickness direction of cap plate
T' thickness direction of connecting piece
W' transverse direction of connecting piece
L' longitudinal direction of connecting piece
C longitudinal central axis

DETAILED DESCRIPTION

Hereinafter a secondary battery according to the present disclosure will be described in detail in combination with the figures.

Referring to FIGS. 1-11, a secondary battery according to the present disclosure comprises a cap plate 1 and at least one cell 2, the cap plate 1 is provided with electrode terminals 11, each cell 2 comprises a main body 21 and tabs 22 electrically connected to the main body 21 and extending from the main body 21. The secondary battery further comprises connecting pieces 3. Each connecting piece 3 is parallel to the cap plate 1 and is positioned at an inside of the cap plate 1 in a thickness direction T of the cap plate 1 (in FIG. 5, the inside is a side out of the paper surface; in FIGS. 6-9, the inside is a side below the cap plate 1 in the thickness direction T of the cap plate 1), a longitudinal direction L' of each connecting piece 3 is parallel to a length direction L of the cap plate 1, a transverse direction W' of each connecting piece 3 is parallel to the width direction W of the cap plate 1, each connecting piece 3 has: a tab welding portion 31 for being welded to the corresponding tab 22 of each cell 2; and an electrode terminal welding portion 32 connected to the tab welding portion 31 along the longitudinal direction L' of each connecting piece 3 for being welded to the corresponding electrode terminal 11 of the cap plate 1 so as to electrically connect the corresponding electrode terminal 11 and the corresponding tab 22 of each cell 2.

In the secondary battery according to the present disclosure, the corresponding tab 22 of each cell 2 is welded to the tab welding portion 31 of the corresponding connecting piece 3, the corresponding electrode terminal 11 of the cap plate 1 is welded to the electrode terminal welding portion 32 of the corresponding connecting piece 3 so as to realize an electrical connection between the corresponding electrode terminal 11 and the corresponding tab 22 of each cell 2. And during the electrical connection of the connecting piece 3, each connecting piece 3 need not be bent, which completely eliminates the requirement on bending property of each connecting piece 3, and in turn eliminates chips generated by each connecting piece 3 due to bending fatigue of each connecting piece 3 and a risk that each connecting piece 3 fractures due to bending fatigue of each connecting piece 3. Moreover, with such a structure of each connecting piece 3, the secondary battery of the present disclosure also increases an available space in the secondary battery from whole height, improves the production efficiency and reduces the production cost.

In addition, it should be noted that, a thickness direction T' of each connecting piece 3 is parallel to the thickness direction T of the cap plate 1.

Figure 3:
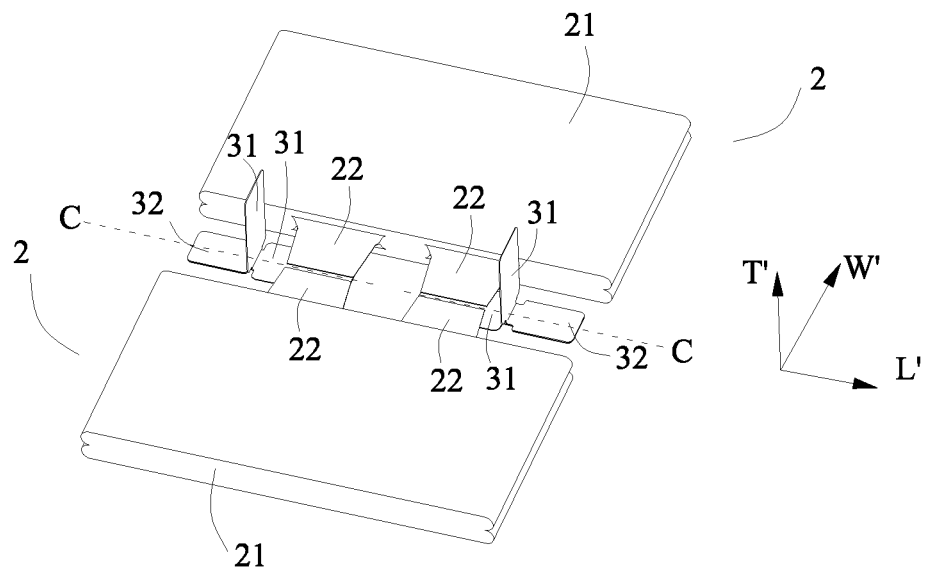
FIG. 3 is a perspective view before the connecting pieces are welded to tabs of cells in the secondary battery according to the present disclosure.
Figure 4:
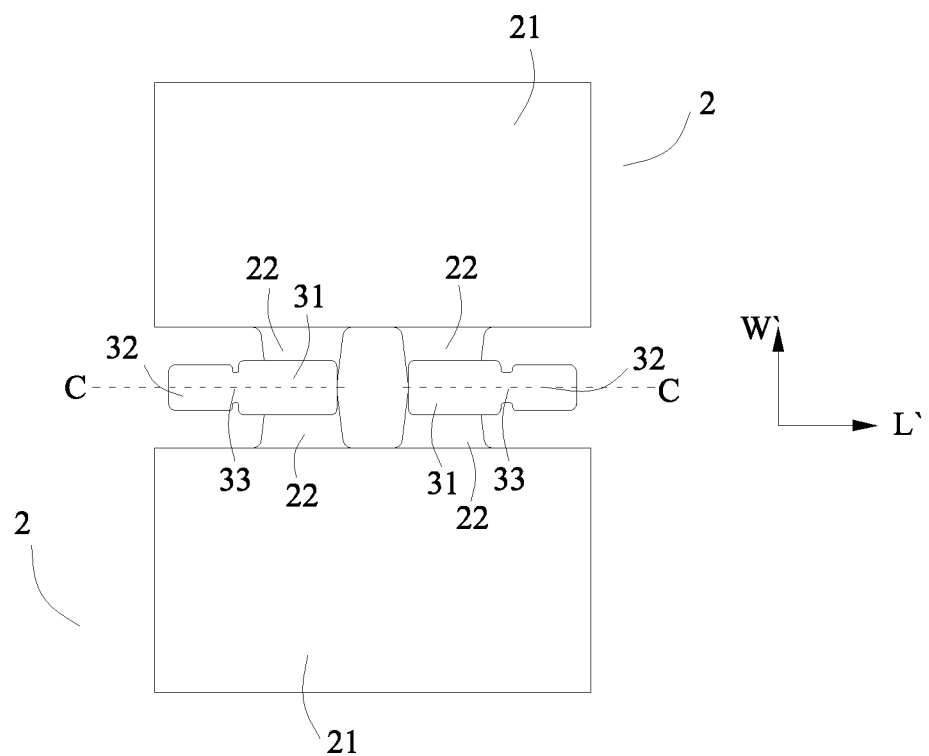
FIG. 4 is a top view before the connecting pieces are welded to the tabs of the cells in the secondary battery according to the present disclosure with every two tab welding portions clamp a corresponding pair of tabs.
Figure 5:
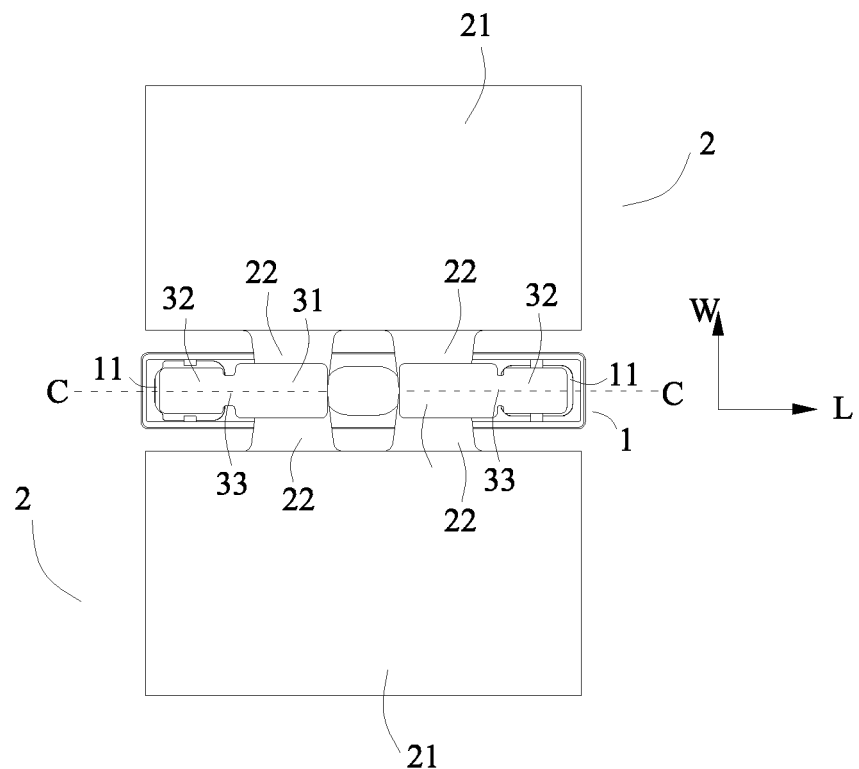
FIG. 5 is a top view when the connecting pieces, the tabs of the cells and a cap plate of the secondary battery according to the present disclosure are welded with only a local two dimensional coordinate of the cap plate indicated.
Figure 6:
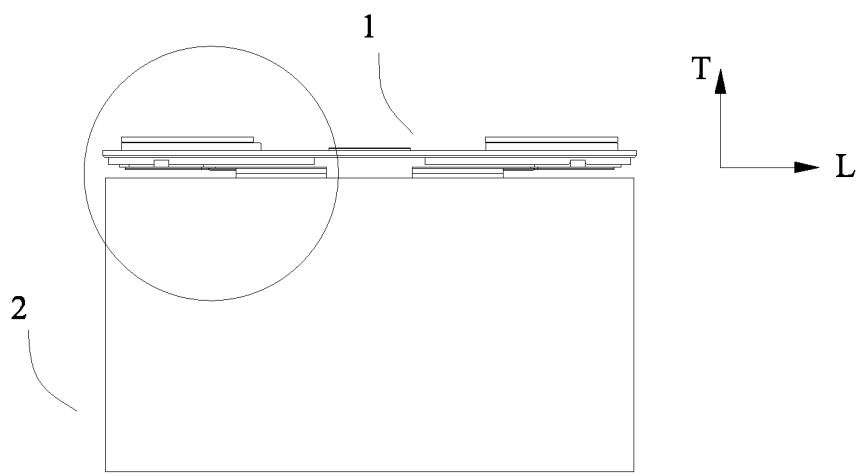
FIG. 6 is a front view after the connecting pieces are welded to the tabs of the cells and are bent in the secondary battery of the present disclosure with only the local two dimensional coordinate of the cap plate indicated.
Figure 7:
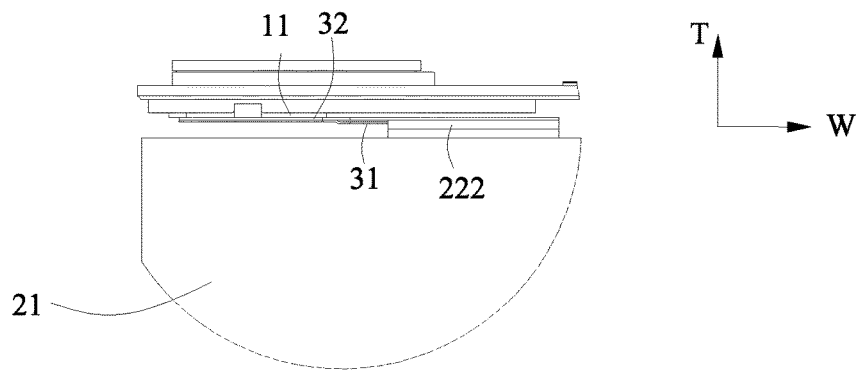
FIG. 7 is an enlarged view of a circle part of FIG. 6 with only the local two dimensional coordinate of the cap plate indicated.
Figure 8:
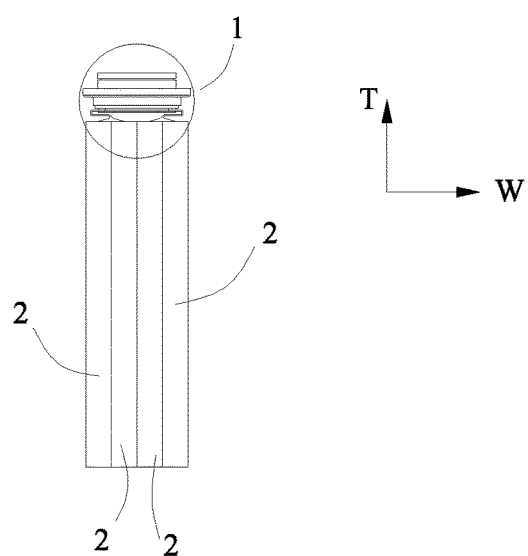
FIG. 8 is a left view of FIG. 6 with only the local two dimensional coordinate of the cap plate indicated.
Figure 9:
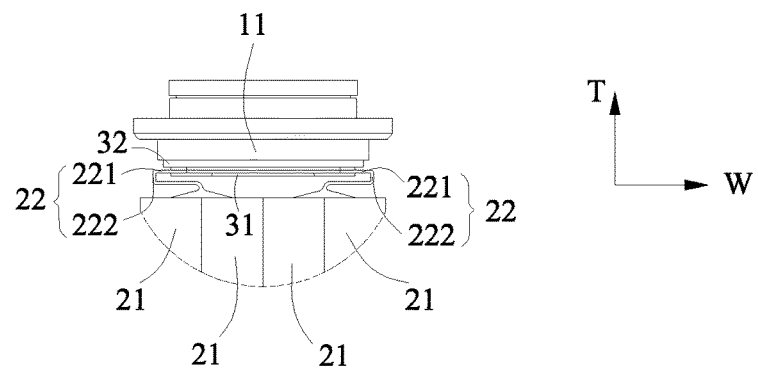
FIG. 9 is an enlarged view of a circle part of FIG. 8 with only the local two dimensional coordinate of the cap plate indicated.

In the secondary battery according to the present disclosure, in an embodiment, referring to FIGS. 3-5, the tabs 22 of each cell 2 extend straight from the main body 21 parallel to the main body 21 of each cell 2 and parallel to the width direction W of the cap plate 1. With such a design, it is very suitable for a second battery which has a shape like a flat panel, so as to facilitate the thinness of an electronic device employing such a secondary battery. In an embodiment, referring to FIGS. 3-5, the number of the cells 2 is two (i.e. the secondary battery comprises the two cells), the two main bodies 21 of the two cells 2 are parallel to the width direction W of the cap plate 1 and are positioned respectively at two sides of each connecting piece 3 in the transverse direction W' which is parallel to the width direction W of the cap plate 1, one tab 22 of one cell 2 and one tab 22 of the other cell 2 are electrically connected to the tab welding portion 31 of one corresponding connecting piece 3 along the width direction W of the cap plate 1. With such a design, it is very suitable for a second battery which has a shape like a flat panel, so as to facilitate the thinness of an electronic device employing such a secondary battery. In addition, it should be noted that, the number of the cells 2 is not limited to this, and the number of the cells 2 may also be more than two. When the number of the cells 2 is more than two, the cells 2 are positioned respectively at the two sides of each connecting piece 3 in the transverse direction W' which is parallel to the width direction W of the cap plate 1, and the number of the cells 2 and a thickness of each cell 2 at one side may be different from the number of the cells 2 and a thickness of each cell 2 at the other side, as long as it assures a total height of the stacked cell(s) 2 at one side is the same as a total height of the stacked cell(s) 2 at the other side.

In an embodiment, referring to FIGS. 3-5, the two cells 2 are symmetric about a longitudinal central axis C of each connecting piece 3, the longitudinal central axis C of each connecting piece 3 is parallel to the length direction L of the cap plate 1.

Figure 13:
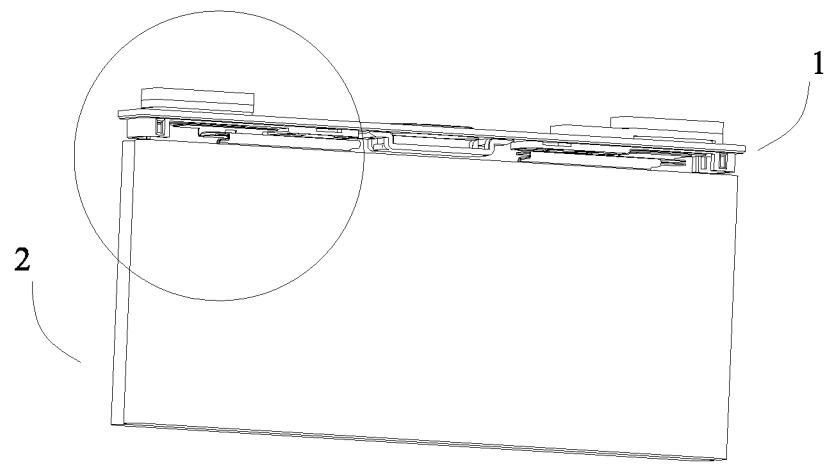
Figure 14:
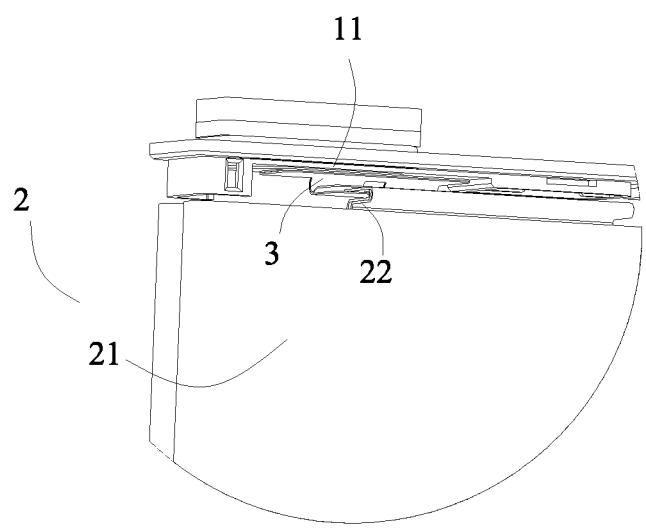

In an embodiment, referring to FIGS. 6-9, the main body 21 of each cell 2 is upright in the thickness direction T of the cap plate 1; each tab 22 of each cell 2 has: a planar portion 221 parallel to the width direction W of the cap plate 1 and weld to the tab welding portion 31; and an upright portion 222 extending parallel to the main body 21 and connected to the planar portion 221 so as to form a reversed L shape together with the planar portion 221. At this time, each tab 22 is bent only once, so that it reduces the requirement on the bending property of each tab 22, and greatly reduces a risk that each tab 22 fractures due to bending fatigue of each tab 22, reduces the production cost, improves the production efficiency and at the same time can increase an available space in the whole secondary battery from whole height. In addition, it should be noted that, although the bending of each tab 22 shown in FIG. 9 seems similar to that shown in FIG. 13, however, each tab 22 in FIG. 13 will be bent twice to form a horizontal U shape, each tab 22 in the present disclosure is bent only once to form a reversed L shape due to a relative position of each tab 22 provided to one corresponding main body 21.

In an embodiment, the number of the cells 2 is two (i.e. the secondary battery comprises the two cells 2) and the two cells 2 are arranged side by side along the width direction W of the cap plate 1, the planar portion 221 of one tab 22 of one cell 2 and the planar portion 221 of one tab 22 of the other cell 2 are welded to the tab welding portion 31 of one corresponding connecting piece 3. But the number of the cells 2 is not limited to this, the number of the cells 2 can be more than two. When the number of the cells 2 is more than two, all the cells 2 can be arranged side by side along the width direction W of the cap plate 1, the planar portions 221 of the corresponding tabs 22 of all the cells 2 are stacked and welded to the tab welding portion 31 of one corresponding connecting piece 3.

In an embodiment, each electrode terminal 11 corresponds to one corresponding connecting piece 3 and one corresponding tab 22 of each cell 2 is welded to the one corresponding connecting piece 3. In an embodiment, the connecting piece 3 may be formed as a single metal sheet. In an embodiment, each connecting piece 3 may be formed as metal sheets. Furthermore, a thickness of each of the metal sheets may be the same or different. In an embodiment, one corresponding tab 22 of each cell 2 may be clamped between any two adjacent metal sheets of the connecting piece 3.

Figure 2:
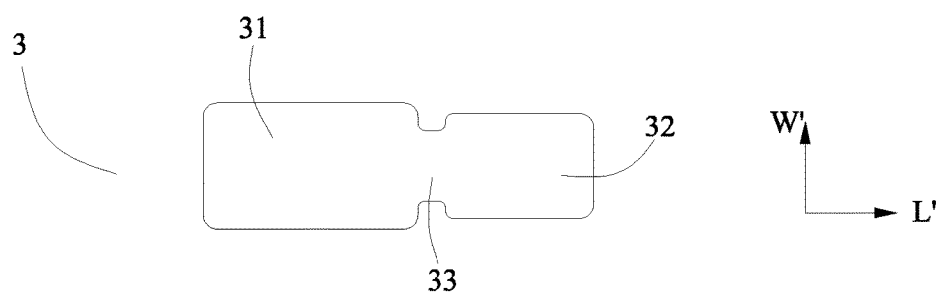
FIG. 2 is a top view of one connecting piece of FIG. 1.

In an embodiment, referring to FIG. 1 and FIG. 2, each electrode terminal 11 corresponds to two corresponding connecting pieces 3, one corresponding tab 22 of each cell 2 is welded to the two corresponding connecting pieces 3. Referring to FIGS. 3-9, one corresponding tab 22 of each cell 2 is clamped between the two tab welding portions 31 of the two corresponding connecting pieces 3, and the two electrode terminal welding portions 32 of the two corresponding connecting pieces 3 are stacked and fixed along the thickness direction T of the top plate 1 so as to make the two corresponding connecting pieces 3 formed integrally. In an embodiment, thicknesses of the two corresponding connecting pieces 3 are the same. In an embodiment, each connecting piece 3 can be formed as a single metal sheet. In an embodiment, each connecting piece 3 can be formed as metal sheets. Furthermore, a thickness of each of the metal sheets may be the same or different.

In an embodiment, a shape of each connecting piece 3 may be rectangle, circle, ellipse, arc, square or rectangle with rounded corners. But the shape of each connecting piece 3 is not limited to that, but may be other shapes.

In an embodiment, referring to FIGS. 1-5, FIG. 10 and FIG. 11, each connecting piece 3 may further has a transitional portion 33 positioned between the tab welding portion 31 and the electrode terminal welding portion 32 and connecting the tab welding portion 31 and the electrode terminal welding portion 32.

In an embodiment, referring to FIGS. 1-5 and FIG. 10, the transitional portion 33, the tab welding portion 31 and the electrode terminal welding portion 32 may cooperate with each other to form a recess. The formation of the recess can save material, particularly when each electrode terminal 11 corresponds to two corresponding connecting pieces 3 (referring to FIG. 1 and FIGS. 3-5), in order to allow the two corresponding connecting pieces 3 to clamp one corresponding tab 22 of each cell 2, one connecting piece 3 need be bent up. The formation of the recess further allows the one connecting piece 3 to be bent down and flattened easily. In this embodiment, the formation of the recess is a preferred configuration related to the transitional portion 33 in the present disclosure, of course the present disclosure is not limited to this, based on different widths and shapes of the tab welding portion 31 and the electrode terminal welding portion 32, the size and shape of the transitional portion 33 can be changed appropriately.

Figure 10:
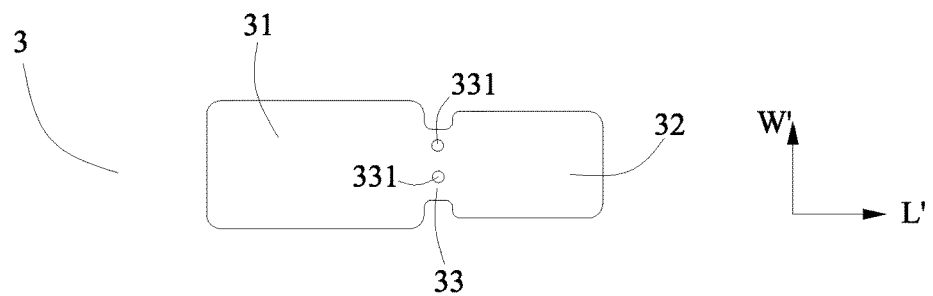
FIG. 10 is a view illustrating a variation of FIG. 2.
Figure 11:
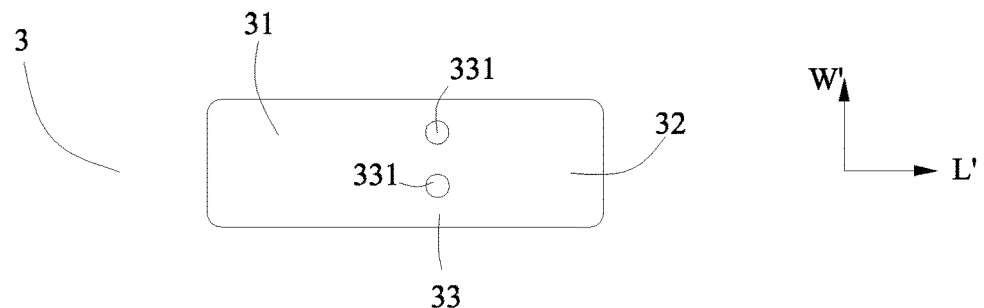
FIG. 11 is a view illustrating a variation of FIG. 10.
Figure 12:
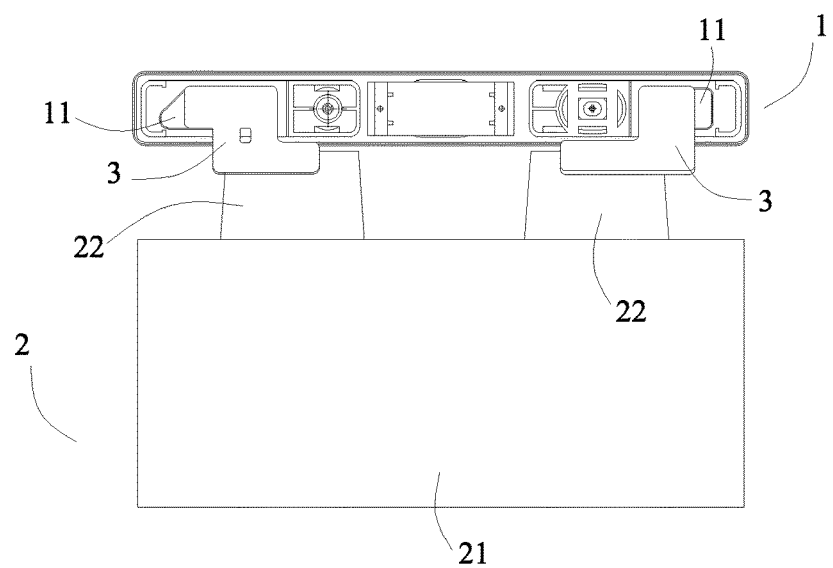

In an embodiment, referring to FIG. 10 and FIG. 11, the transitional portion 33 may have a hole 331 provided between the tab welding portion 31 and the electrode terminal welding portion 32. The provision of the hole 331 can save material, particularly when each corresponding electrode terminal 11 corresponds to two corresponding connecting pieces 3 (referring to FIG. 1 and FIGS. 3-5), in order to allow the two corresponding connecting pieces 3 to clamp one corresponding tab 22 of each cell 2, one connecting piece 3 need be bent up. The provision of the hole 331 further allows the one connecting piece 3 to be bent down and flattened easily.

Finally, unless otherwise noted, each connecting piece 3, each tab 22, each electrode terminal 11 are electrically conductive. Furthermore, each connecting piece 3, each tab 22 and each electrode terminal 11 may be made of metal.

What is claimed is:

1. A secondary battery, comprising:
a cap plate provided with electrode terminals;
at least one cell, each cell comprising a main body and tabs electrically connected to the main body and extending from the main body; and
connecting pieces, each connecting piece being parallel to the cap plate and positioned at an inside of the cap plate in a thickness direction of the cap plate, a longitudinal direction of each connecting piece being parallel to a length direction of the cap plate, a transverse direction of each connecting piece being parallel to a width direction of the cap plate, each connecting piece having:
a tab welding portion for being welded to the corresponding tab of each cell; and
an electrode terminal welding portion connected to the tab welding portion along the longitudinal direction of each connecting piece for being welded to the corresponding electrode terminal of the cap plate so as to electrically connect the corresponding electrode terminal and the corresponding tab of each cell;
wherein:
each connecting piece is a flat plate shape,
the at least one cell is provided with two cells in number, the two cells are arranged side by side along the width direction of the cap plate, and the main body of each cell is upright along the thickness direction of the cap plate;
each tab of each cell has a planar portion parallel to the width direction of the cap plate; and
the planar portion of one cell and the planar portion of the other cell extend toward each other and are welded to one surface of the tab welding portion of one corresponding connecting piece.

2. The secondary battery according to claim 1, wherein the two cells are symmetric about a longitudinal central axis of each connecting piece, the longitudinal central axis of each connecting piece is parallel to the length direction of the cap plate.

3. The secondary battery according to claim 1, wherein each tab of each cell further has:

an upright portion extending parallel to the main body and connected to the planar portion so as to form a reversed L shape together with the planar portion.

4. The secondary battery according to claim 1, wherein each electrode terminal corresponds to one corresponding connecting piece and one corresponding tab of each cell is welded to the one corresponding connecting piece.

5. The secondary battery according to claim 3, wherein each electrode terminal corresponds to one corresponding connecting piece and one corresponding tab of each cell is welded to the one corresponding connecting piece.

6. The secondary battery according to claim 1, wherein each electrode terminal corresponds to two corresponding connecting pieces and one corresponding tab of each cell is welded to the two corresponding connecting piece, one corresponding tab of each cell is clamped in the two tab welding portions of the two corresponding connecting pieces, and the two electrode terminal welding portions of the two corresponding connecting pieces along the thickness direction of the top plate are stacked and fixed so as to make the two corresponding connecting pieces formed integrally.

7. The secondary battery according to claim 3, wherein each electrode terminal corresponds to two corresponding connecting pieces and one corresponding tab of each cell is welded to the two corresponding connecting piece, one corresponding tab of each cell is clamped in the two tab welding portions of the two corresponding connecting pieces, and the two electrode terminal welding portions of the two corresponding connecting pieces along the thickness direction of the top plate are stacked and fixed so as to make the two corresponding connecting pieces formed integrally.

8. The secondary battery according to claim 1, wherein each connecting piece is formed as a single metal sheet.

9. The secondary battery according to claim 1, wherein each connecting piece is formed as metal sheets.

10. The secondary battery according to claim 1, wherein each connecting piece further has:

a transitional portion positioned between the tab welding portion and the electrode terminal welding portion and connecting the tab welding portion and the electrode terminal welding portion.

11. The secondary battery according to claim 2, wherein each connecting piece further has:

a transitional portion positioned between the tab welding portion and the electrode terminal welding portion and connecting the tab welding portion and the electrode terminal welding portion.

12. The secondary battery according to claim 3, wherein each connecting piece further has:

a transitional portion positioned between the tab welding portion and the electrode terminal welding portion and connecting the tab welding portion and the electrode terminal welding portion.

\* \* \* \* \*